(12) United States Patent  
Vallejo et al.

(10) Patent No.: US 8,746,396 B2  
(45) Date of Patent: Jun. 10, 2014

(54) WHEEL HUB, ASSEMBLY, AND METHOD

(75) Inventors: Carlos A. Vallejo, Lawrence Park, PA (US); Balamurugan Ramasamy, Udumalpet (IN)

(73) Assignee: General Electric Company, Schenectady, NY (US)

( * ) Notice: Subject to any disclaimer, the term of this patent is extended or adjusted under 35 U.S.C. 154(b) by 378 days.

(21) Appl. No.: 13/171,859

(22) Filed: Jun. 29, 2011

(65) Prior Publication Data

US 2013/0002007 A1    Jan. 3, 2013

(51) Int. Cl.
*B60K 17/356* (2006.01)
(52) U.S. Cl.
USPC .......................................................... 180/383
(58) Field of Classification Search
USPC ................. 180/383, 384, 385; 301/65, 105.1
See application file for complete search history.

(56) References Cited

U.S. PATENT DOCUMENTS

| | | | |
|---|---|---|---|
| 2,082,384 A | 6/1937 | Dunn | |
| 2,336,959 A * | 12/1943 | Redman | 301/38.1 |
| 2,501,018 A * | 3/1950 | Ash | 301/13.1 |
| 3,143,376 A | 8/1964 | Di Federico | |
| 4,902,074 A | 2/1990 | DeRegnaucourt et al. | |
| 2003/0010564 A1 | 1/2003 | Hinton et al. | |

FOREIGN PATENT DOCUMENTS

| | | |
|---|---|---|
| EP | 2213497 A1 | 8/2010 |
| LU | 44886 A1 | 5/1965 |

OTHER PUBLICATIONS

Search Report and Written Opinion from corresponding PCT Application No. PCT/US2012/043675 dated Sep. 20, 2012.

* cited by examiner

*Primary Examiner* — Faye M. Fleming
(74) *Attorney, Agent, or Firm* — John A. Kramer; GE Global Patent Operation

(57) ABSTRACT

A wheel hub, for use on off-highway vehicles, includes a first flange defining a wheel axis and a second flange spaced apart from the first flange along the wheel axis. The first flange includes a generally annular attachment face generally orthogonal to the wheel axis, while the second flange includes an axially inward side confronting the attachment face. The wheel hub also includes a plurality of rungs extending from the first flange to the second flange. Torque is transferred between the first flange and the second flange via the plurality of rungs. Additionally, the wheel hub includes a lubricant retention structure associated with at least one of the first flange and the second flange at a radially inward surface thereof.

20 Claims, 4 Drawing Sheets

WHEEL HUB, ASSEMBLY, AND METHOD

FIELD OF THE INVENTION

Embodiments of the invention relate to off-highway vehicles ("OHVs"). More particularly, embodiments of the invention relate to wheel hubs and assemblies for use on OHVs.

BACKGROUND OF THE INVENTION

Large off-highway vehicles ("OHVs"), such as mining vehicles used to haul heavy payloads excavated from open pit mines, are well known and usually employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque low speed rotational energy output which is supplied to the rear wheels.

Typical operating loads in an OHV may exceed one hundred tons, while the gross weight of vehicle and load may be several hundred tons. The weight of a single wheel drive assembly can be in excess of ten tons, and inertia of the wheel drive assembly can affect operation of the vehicle as a whole. Accordingly, it is desirable to reduce wheel drive assembly weight while maintaining strength to support and move the entire heavy vehicle. Thus, it is desirable to provide wheel assembly components with shapes that minimize non-load-bearing material.

BRIEF DESCRIPTION OF THE INVENTION

According to an embodiment of the present invention, a wheel hub for use on off-highway vehicles includes a first flange defining a wheel axis and a second flange spaced apart from the first flange along the wheel axis. The first flange includes a generally annular attachment face generally orthogonal to the wheel axis, while the second flange includes an axially inward side confronting the attachment face. The inventive wheel hub also includes a plurality of rungs extending from the first flange to the second flange. Torque is transferred between the first flange and the second flange via the plurality of rungs. Additionally, the wheel hub includes a lubricant retention structure associated with at least one of the first flange and the second flange at a radially inward surface thereof.

According to another embodiment of the present invention, a wheel assembly, for use on an off-highway vehicle of gross weight in excess of three hundred (300) tons, includes a wheel frame and a unitary wheel hub, which weighs less than about three (3) tons and is mounted around the wheel frame on a plurality of bearings. Embodiments of the inventive wheel hub include a generally annular first flange defining a wheel axis, and a generally annular second flange spaced apart from the first flange along the wheel axis, and disposed generally parallel to the first flange. The inventive wheel hub also includes a lubricant retention structure associated with at least one of the first flange and the second flange, and a plurality of rungs connected between the first flange and the second flange at a corresponding plurality of circumferential locations. Each of the first flange and the second flange is capable of supporting at least about six hundred thousand (600,000) Newtons (N) radial load. The rungs are capable to transfer at least about twelve thousand (12,000) N-m torque. The first flange, the second flange, and the rungs are cast as one piece.

According to an embodiment of the present invention, a unitary wheel hub is manufactured by casting. The unitary wheel hub is cast by pouring molten metal into a mould, which includes a generally annular first cavity for forming a generally annular first end of the wheel hub defining a wheel axis. The first cavity of the mould defines a mould axis. The mould also includes a generally annular second cavity that is offset from the first cavity along the mould axis for forming a generally annular second end of the wheel hub offset from the first end along the wheel axis. The mould also includes a plurality of runners extending from the first cavity to the second cavity generally parallel to and radially displaced from the mould axis. The runners are generally evenly spaced apart around the circumferences of the first cavity and the second cavity. Each runner defines a discrete generally cylindrical volume that is contiguous with the first cavity and with the second cavity. After casting, the metal is cooled to form the wheel hub. The mould then is removed from the wheel hub.

As used herein, the terms "substantially" or "about" or "around" are intended to indicate a condition within reasonably achievable manufacturing and assembly tolerances, relative to an ideal desired condition suitable for achieving the functional purpose of a component or assembly. By way of an example, an assembly of components in "substantial" alignment to a common axis of rotation may deviate from perfectly co-axial alignment so long as all the components can rotate as intended for accomplishing the functional purpose of the assembly.

By further example, a dimension that is "around" a certain measurement may vary to an extent within normal manufacturing tolerances or design margins. For example, a shoulder bolt that is around 10 cm in length may be between 9.5 cm and 10.5 cm (+/−5%) in length. Similarly a flange that is at least around 5 cm in thickness may be 4.975 cm (−5%) or greater in thickness.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
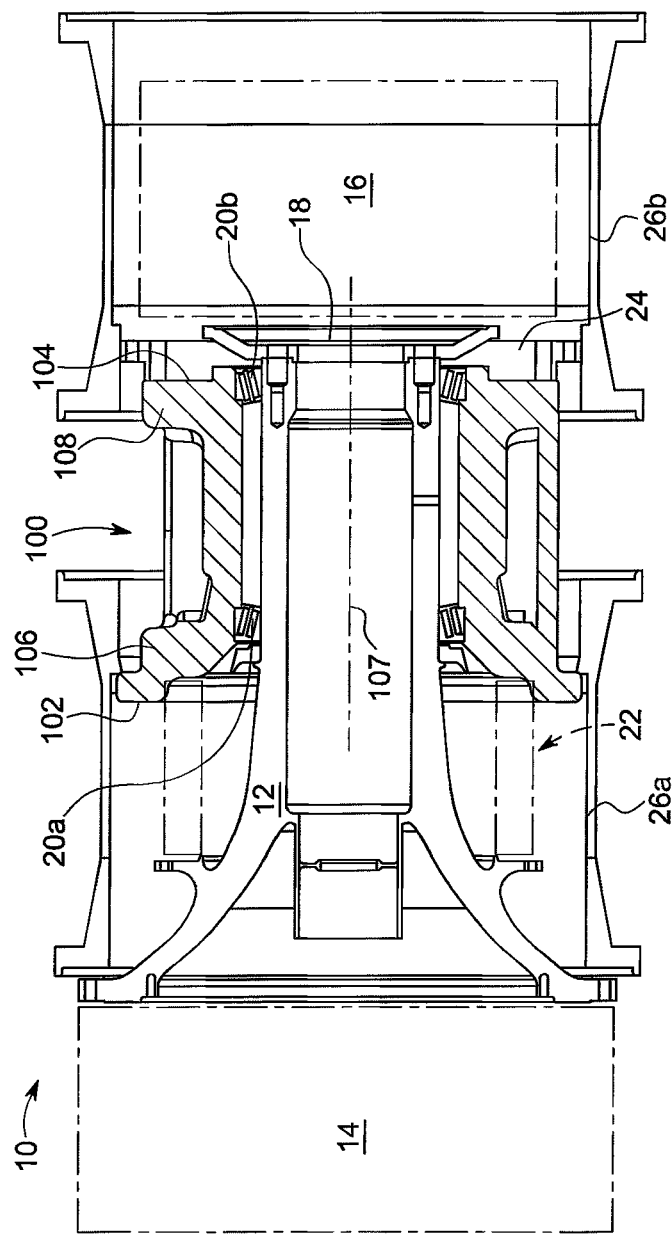
FIG. 1 is a side sectional view of a wheel drive assembly usable on an OHV, including a weight-optimized wheel hub according to a first embodiment of the present invention.

Reference will be made below in detail to exemplary embodiments of the invention, examples of which are illustrated in the accompanying drawings. Wherever possible, the same reference numerals used throughout the drawings refer to the same or like parts; however, this is merely for illustration purposes, since such embodiments could have other, different parts instead.

FIG. 1 depicts a wheel drive assembly 10 for use on mining dump trucks and other off-highway vehicles. In some embodiments, the wheel drive assembly 10 may be used on a vehicle in excess of three hundred (300) metric tons gross vehicle weight (GVW). The wheel drive assembly 10 includes a wheel frame 12, to which are mounted, at a first end, a traction motor 14 (shown in FIG. 1 by phantom lines), and at a second end, opposite the traction motor, a planetary geared transmission 16 (also shown in phantom lines) that is coupled to the wheel frame 12 by a coupling plate 18. The traction motor 14 and the transmission 16 are operably connected by a shaft (not shown) that is rotatably housed within the wheel frame 12. Between the traction motor 14 and the geared transmission 16, according to a first embodiment of the invention, a wheel hub 100 is rotatably supported around the wheel frame 12 on "inboard" and "outboard" bearings 20a, 20b. With reference to components disposed on the wheel frame 12, "inboard" and "outboard" indicate similar components respectively closer to and further from the traction motor 14.

An embodiment of the inventive wheel hub 100 is rotatably sealed to the wheel frame 12 via a labyrinth seal 22 or the like (shown in FIG. 1 by phantom lines), a part of which is mounted to the wheel hub 100 at a first end face 102, opposite the transmission 16. The wheel hub 100 extends from the first end face 102 to a second end face 104 proximate the transmission 16. The transmission 16 is operably connected to the second end face 104 of the wheel hub 100, via a torque tube (not shown) and an adapter ring 24 that is mounted to the second end face.

The wheel hub 100 includes a generally annular first flange 106 adjacent to its first end face 102. The first flange 106 defines a wheel axis 107, and the wheel hub 100 is mounted so that the wheel axis is generally coaxial with a rotational axis of the wheel frame 12. In some embodiments, at the first flange 106 an "inboard" wheel rim 26a can be mounted to the wheel hub 100, while an "outboard" wheel rim 26b can be mounted to the adapter ring 24. The wheel hub also includes a generally annular second flange 108 adjacent to its second end face 104. In some embodiments, torque loads between the first flange 106 and the second flange 108 may exceed about twelve thousand (12,000) N-m. In some embodiments, each of the flanges 106, 108 may be subject to about sixty (60) metric tons (about 600,000 N) weight loading. The flanges are suitably sturdy to withstand such forces without damage.

Figure 2:
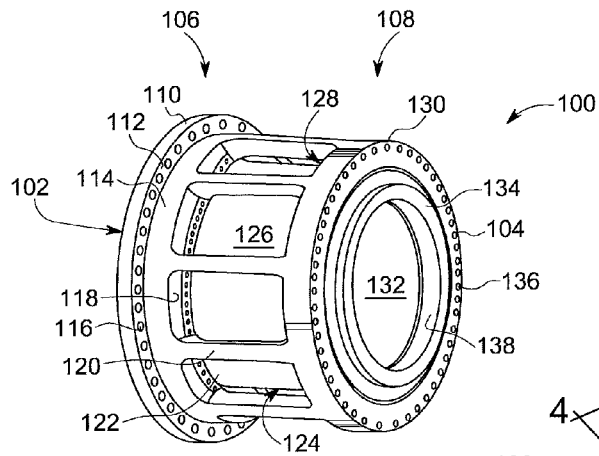
FIGS. 2 and 3 are perspective views of the weight-optimized wheel hub shown in FIG. 1.

Referring to the embodiment depicted in FIG. 2, the first flange 106 of the wheel hub 100 has a generally cylindrical peripheral face 110 that defines an outer diameter of the wheel hub. The peripheral face 110 extends from the first end face 102 to a flange face 112 that faces away from the first end face 102. The flange face 112 extends radially inward from the peripheral face 110 to a boss shoulder 114. At radial locations between the peripheral face 110 and the boss shoulder 114, the flange 106 may include a circumferentially spaced first plurality of bores 116 extending generally parallel to the peripheral face 110.

From the flange face 112, the boss shoulder 114 extends away from the first end face 102 of the wheel hub 100 to a boss face or attachment face 118 that faces away from the first end face. At the boss face 118, a circumferentially spaced array of peripheral rungs 120, and a central barrel 122, are formed or attached integrally with the first flange 106 and extend from the first flange toward the second end face 104 of the wheel hub 100. Each rung 120 is blended or filleted inward along the boss face 118, at a first end of the rung, to join contiguous with the barrel 122.

The dimensions of the windows 124 may be determined by a variety of methods. In some embodiments, the windows 124 are designed according to a process of topology optimization, in which geometry of the rungs and barrel is iteratively adjusted to "flow" material from low-stress regions toward high-stress regions. Thus, the rungs extend radially and circumferentially separated from the barrel and from each other between the two flanges 106 and 108. In some embodiments, an odd number of rungs are provided at equally-spaced circumferential locations. Using an odd number of rungs may reduce cyclic stresses on the rungs and flanges. In select embodiments, nine rungs are used based on optimization of weight and rotational inertia. In some embodiments, each rung may have an equivalent diameters of at least about 5 cm. "Equivalent diameter" here is meant to define a diameter of a circle having the same area as a cross-section of the rung.

Figure 3:
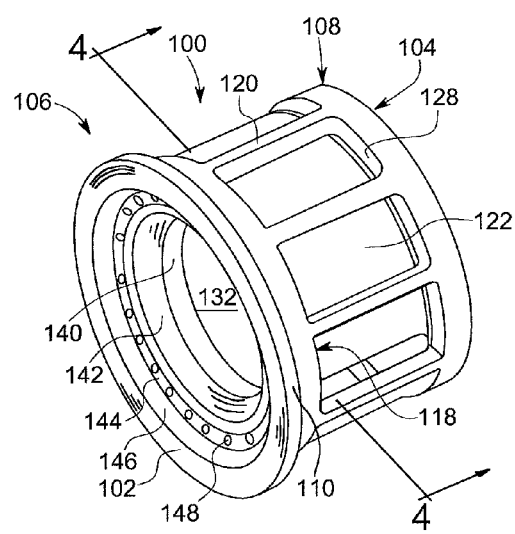
Figure 4:
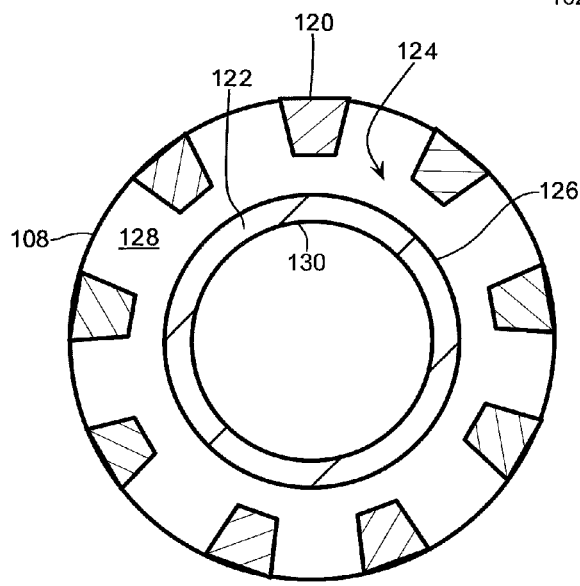
FIG. 4 is an axial sectional view of the wheel hub shown in FIGS. 1-3.

The rungs 120 and the barrel 122 extend from the boss face 118 to the second flange 108 that is formed adjacent the second end face 104 of the wheel hub 100. The rungs 120 and the barrel 122 are formed integrally with the second flange 108 at an axially inward side 128, which confronts the first flange 106. In the embodiment shown in FIGS. 1-3, a second end of each rung 120 is blended or filleted inward along the axially inward side 128 of the second flange 108 to join contiguous with the barrel 122. The rungs 120 are "peripheral" in that they are radially spaced outward from the barrel 122, such that each rung defines a window 124 with the outer surface 126 of the barrel 122, as shown in FIG. 4 looking toward the second flange 108. Each rung 120 is contiguous with a generally cylindrical outer surface 130 of the second flange 108, and therefore is disposed radially inward from the boss shoulder 114 of the first flange 106.

The generally cylindrical outer surface 130 extends from the axially inward side 128 to the second end face 104 of the wheel hub 100. At the juncture of the second flange 104 with the inner surface 132 of the barrel 122, a circumferential lip 134 protrudes from the second end face 104. In some embodiments, the second end face 104 may include a circumferentially spaced second plurality of bores 136 extending generally parallel to the outer surface 130.

Referring back to FIG. 3, the inner surface of the circumferential lip 134 includes an outboard bearing housing 138 for receiving the outboard bearing 20b. From the bearing housing 136, the inner surface 132 of the barrel 122 extends toward the first end face 102 to an inboard bearing housing 140 for receiving the inboard bearing 20a. Between the inboard bearing housing 140 and the first end face 102, the inner surface 132 of the barrel 122 includes an outwardly conically flared first transition portion 142, a generally axially facing internal shoulder surface 144 that extends radially outward from the first transition portion, and a second conical flared portion 146 that is contiguous between the internal shoulder surface 144 and the first end face 102. In some embodiments, the internal shoulder surface 144 may include a circumferentially spaced third plurality of bores 148 extending generally parallel to the peripheral face 110.

Figure 5:
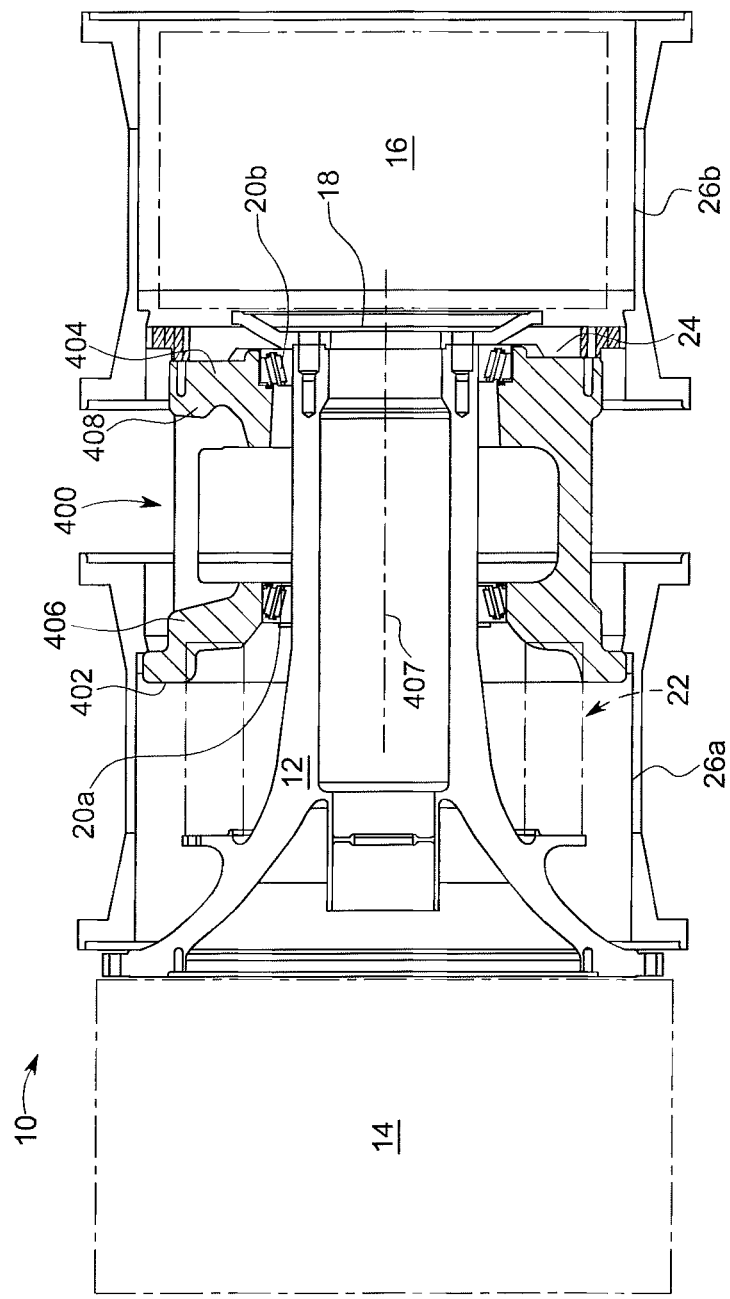
FIG. 5 is a side sectional view of a wheel drive assembly usable on an OHV, including a weight-optimized wheel hub according to a second embodiment of the present invention.

A second embodiment of the invention is shown in FIG. 5, in which an inventive wheel hub 400 is mounted around a wheel frame 12. The wheel hub 400 extends from a first end face 402, disposed proximate to a traction motor 14, to a second end face 404 disposed proximate to a planetary geared transmission 16. The wheel hub is supported on bearings 20a, 20b and is connected with the transmission 16 via a torque tube (not shown) that is connected between the transmission and an adapter ring 24 that is fastened to the second end face 404.

Figure 6:
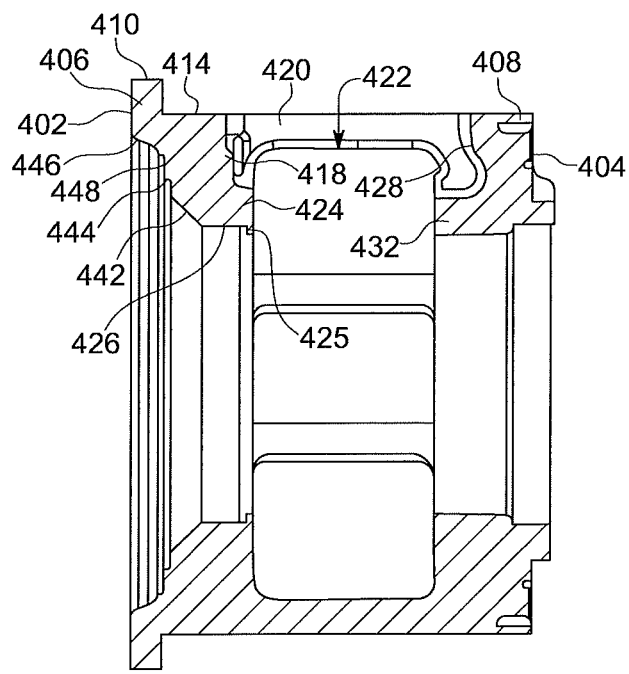
FIG. 6 is a side sectional view of the wheel hub shown in FIG. 5.

FIG. 6 shows a side section view of wheel hub 400. Unlike the wheel hub 100 shown in FIGS. 1-4, the wheel hub 400 lacks a "barrel," so that torques, shear loads, and bending moments between a first flange 406 (adjacent the first end face 402) and a second flange 408 (adjacent the second end face 404) will be carried entirely by a circumferentially spaced plurality of rungs 420. In some embodiments, the inboard and outboard bearings 20a, 20b support the flanges 406, 408 on the wheel frame 12, such that substantially no bending loads (tension or compression) are exerted on the rungs 420. Instead of a barrel, the first flange 406 and the second flange 408 are offset from each other across an axial gap 422.

The first flange 406 includes a boss face 418 that confronts the second flange 408, and the second flange includes an axially inward side 428 that confronts the first flange. At a radially inward edge of the boss face 418, the first flange 406 also includes a first annulus 424 that has an inward circumferential lip 425, which defines an inboard bearing housing 426 for receiving the inboard bearing 20a. In some embodiments the lip 425 is configured to seal against the wheel frame 12 such that lubricant can be retained in a sealed volume between the lip 425 and the end of the wheel frame 12 adjacent to the traction motor 14.

Similarly, the second flange 408 includes a second annulus 432 that protrudes from a radially inward edge of the axially inward side 428 toward the first flange 406. In some embodiments the annulus 432 includes a radially inward portion that is configured to seal against the wheel frame 12 such that lubricant can be retained in a sealed volume defined by the annulus 432 and by the transmission 16. In some embodiments, the bearings 20a and 20b can be configured as lubricant retention structures.

Figure 7:
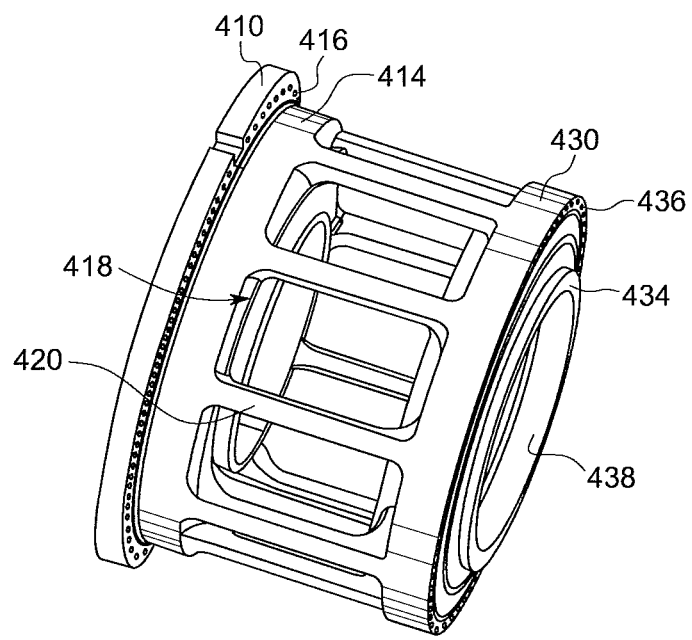
FIG. 7 is a perspective view of the wheel hub shown in FIG. 5.

FIG. 7 shows a perspective view of wheel hub 400. Referring to FIGS. 6 and 7, at the boss face 418, a first end of each rung 420 is formed integral with the first flange 406 and extends radially outward from the first annulus 424 to a boss shoulder 414. In some embodiments, the first end of each rung 420 is blended or filleted with the boss face 418 and with the first annulus 424.

Each rung 420 extends from the boss face 418 toward the second flange 408, and a second end of each rung is formed integrally with the axially inward side 428 and with the second annulus 432 of the second flange 408. The second end of each rung extends radially outward from the second annulus 432 to an outer surface 430 of the second flange 408. In some embodiments, the second end of each rung 420 is blended or filleted with the axially inward side 428 and with the second annulus 432.

Still referring to FIGS. 6 and 7, at the juncture of the second flange 404 with the second annulus 432, a circumferential lip 434 protrudes from the second end face 404 to surround an outboard bearing housing 438 for receiving the outboard bearing 20b. In some embodiments, the second end face 404 may include a circumferentially spaced second plurality of bores 436 extending generally parallel to the outer surface 430, radially outward from the lip 434.

As best shown in FIG. 6, between the inboard bearing housing 426 and the first end surface 402, an inner surface of the first flange 406 includes a conical flared first transition portion 442, an internal shoulder surface 444, and a conical flared second transition portion 446 that is contiguous with the first end face 402 of the wheel hub 400. In some embodiments, the internal shoulder surface 444 may include a circumferentially spaced third plurality of bores 448 extending generally parallel to the peripheral face 410.

"Formed integrally", or "attached integrally", in context with either of the inventive wheel hubs 100 or 400, includes monolithic castings, cuttings, or forgings. In some embodiments of the invention, a source material, e.g., steel, is conserved by casting a wheel hub rather than forging and/or cutting the same from a blank.

In use, an embodiment of the invention includes a wheel hub. The inventive wheel hub includes a first flange defining a wheel axis and a second flange spaced apart from the first flange along the wheel axis. The first flange includes a generally annular attachment face generally orthogonal to the wheel axis, while the second flange includes an axially inward side facing the attachment face. The inventive wheel hub also includes a plurality of rungs extending from the first flange to the second flange. Torque is transferred between the first flange and the second flange via the plurality of rungs. Additionally, the wheel hub includes a lubricant retention structure connected with at least one of the first flange and the second flange at a radially inward surface thereof. In some embodiments, the lubricant retention structure includes a radially inwardly protruding lip configured to seal against a wheel frame mounted inside the wheel hub. In some embodiments, the lubricant retention structure includes a barrel surrounding the wheel axis and connected between the first flange and the second flange. In some embodiments, the attachment face of the first flange is circumscribed by a radially outward facing edge surface, and each of the plurality of rungs is disposed radially inward from the edge surface of the first flange. In some embodiments, the first flange includes a generally annular rim protruding toward the second flange from a radially inward portion of the axially facing attachment face, and each of the plurality of rungs is disposed radially outward from the rim of the first flange. In select embodiments, the plurality of rungs consists of an odd number of rungs distributed around the first flange and the second flange at substantially equal circumferential spacing. For example, the plurality of rungs may include nine rungs spaced at about forty (40) degree intervals around the first flange and the second flange. In some embodiments, an off-highway vehicle of gross weight of at least around about three hundred (300) tons is mounted on two inventive wheel hubs.

In some embodiments, an inventive wheel assembly includes a wheel frame and a unitary wheel hub, which weighs less than about three (3) tons and is mounted around the wheel frame on a plurality of bearings. Embodiments of the unitary wheel hub include a generally annular first flange defining a wheel axis, and a generally annular second flange spaced apart from the first flange along the wheel axis, and disposed generally parallel to the first flange. The unitary wheel hub also includes a plurality of rungs connected between the first flange and the second flange at a corresponding plurality of circumferential locations. Each of the first flange and the second flange is capable of supporting at least about six hundred thousand (600,000) Newtons (N) radial load. The rungs are capable to transfer at least about twelve thousand (12,000) N-m torque. In some embodiments, the first flange, the second flange, and the rungs compose a one piece casting. In some embodiments, two inventive wheel assemblies are installed in an off-highway vehicle that has a gross weight of at least around about three hundred tons. In some embodiments, the bearings support the wheel hub on the wheel frame such that the rungs are subject to substantially no bending load. In select embodiments, the plurality of rungs includes nine rungs spaced substantially uniformly about the circumferences of the first flange and the second flange. In some embodiments, the second flange has a radially outward facing outer surface, and each of the plurality of rungs is disposed radially inward from the outer surface of the second flange. In select embodiments, the first flange and the second flange of the wheel hub have inner radii of at least around about 0.4 m. Each of the plurality of rungs of the wheel hub may have a length of at least around about 0.4 m, and an equivalent diameter of at least around about 5 cm. In some embodiments, the lubricant retention structure includes a barrel surrounding the wheel axis and connected between the first flange and the second flange. In other embodiments, the lubricant retention structure includes an annular lip formed integral with an inward edge of one of the first flange or the second flange In some embodiments of the invention, a unitary wheel hub is manufactured by casting. The unitary wheel hub is cast by pouring molten metal into a mould, which includes a generally annular first cavity for forming a generally annular first end of the wheel hub defining a wheel axis. The first cavity of the mould defines a mould axis. The mould also includes a generally annular second cavity that is offset from the first cavity along the mould axis for forming a generally annular second end of the wheel hub offset from the first end along the wheel axis. The mould also includes a plurality of generally cylindrical runners extending from the first cavity to the second cavity generally parallel to and radially displaced from the mould axis. The runners of the mould are generally evenly spaced apart around the circumferences of the first cavity and the second cavity. After casting, the metal is cooled to form the wheel hub. The mould then is removed from the wheel hub.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described wheel hub and wheel assembly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A wheel hub, comprising:
   a first flange defining a wheel axis and having a generally annular attachment face generally orthogonal to the wheel axis;
   a second flange spaced apart from the first flange along the wheel axis and having an axially inward side facing the attachment face;
   a plurality of rungs extending from the attachment face of the first flange to the axially inward side of the second flange, wherein the rungs are configured for the transfer of torque between the first flange and the second flange via the plurality of rungs; and
   a lubricant retention structure associated with at least one of the first flange and the second flange at a radially inward surface thereof.

2. A wheel hub as claimed in claim 1, wherein the lubricant retention structure includes a radially inwardly protruding lip configured to seal against a wheel frame mounted inside the wheel hub.

3. A wheel hub as claimed in claim 1, wherein the lubricant retention structure includes an inner barrel surrounding the wheel axis and connected between the first flange and the second flange, the inner barrel being surrounded by and structurally separate from the plurality of rungs.

4. A wheel hub as claimed in claim 1, wherein the attachment face of the first flange is circumscribed by a radially outward facing edge surface, and each of the plurality of rungs is disposed radially inward from the edge surface of the first flange.

5. A wheel hub, comprising:
   a first flange defining a wheel axis and having a generally annular attachment face generally orthogonal to the wheel axis;
   a second flange spaced apart from the first flange along the wheel axis and having an axially inward side facing the attachment face;
   a plurality of rungs extending from the attachment face of the first flange to the axially inward side of the second flange, wherein the rungs are configured for the transfer of torque between the first flange and the second flange via the plurality of rungs; and
   a lubricant retention structure associated with at least one of the first flange and the second flange at a radially inward surface thereof, wherein the first flange includes a generally annular rim protruding toward the second flange from a radially inward portion of the axially facing attachment face, and each of the plurality of rungs is disposed radially outward from the rim of the first flange.

6. A wheel hub, comprising:
a first flange defining a wheel axis and having a generally annular attachment face generally orthogonal to the wheel axis;
a second flange spaced apart from the first flange along the wheel axis and having an axially inward side facing the attachment face;
a plurality of rungs extending from the attachment face of the first flange to the axially inward side of the second flange, wherein the rungs are configured for the transfer of torque between the first flange and the second flange via the plurality of rungs; and
a lubricant retention structure associated with at least one of the first flange and the second flange at a radially inward surface thereof,
wherein the plurality of rungs consists of an odd number of rungs distributed around the first flange and the second flange at substantially equal circumferential spacing.

7. A wheel hub as claimed in claim 6, wherein the plurality of rungs includes nine rungs spaced at about forty degree intervals around the first flange and the second flange.

8. An off-highway vehicle comprising:
two wheel hubs as recited in claim 1,
wherein each flange of each wheel hub is capable to support at least about six hundred thousand N radial loading and the rungs of each wheel hub are capable to transfer at least about twelve thousand N-m torque between the associated flanges.

9. A wheel assembly, comprising:
a wheel frame; and
a unitary wheel hub, weighing less than about three tons and mounted around the wheel frame on a plurality of bearings, the wheel hub including:
a generally annular first flange defining a wheel axis;
a generally annular second flange spaced apart from the first flange along the wheel axis, and disposed generally parallel to the first flange;
a lubricant retention structure associated with at least one of the first flange and the second flange; and
a plurality of rungs extending from the first flange to the second flange;
wherein the first flange is capable of supporting at least about six hundred thousand N radial load, the second flange is capable of supporting at least about six hundred thousand N radial load, the rungs are capable to transfer at least about twelve thousand N-m torque.

10. A wheel assembly as claimed in claim 9, wherein the first flange, the second flange, and the rungs compose a one piece casting.

11. An off-highway vehicle comprising:
two wheel assemblies as recited in claim 9;
wherein the vehicle has a gross weight of at least about three hundred tons.

12. A wheel assembly as claimed in claim 9, wherein the bearings support the wheel hub on the wheel frame such that the rungs of the wheel hub are subject to substantially no bending load.

13. A wheel assembly as claimed in claim 9, wherein the plurality of rungs of the wheel hub consists of nine rungs spaced substantially uniformly about the circumferences of the first flange and the second flange.

14. A wheel assembly as claimed in claim 9, wherein the second flange has a radially outward facing outer surface, and each of the plurality of rungs is disposed radially inward from the outer surface of the second flange.

15. A wheel assembly as claimed in claim 9, wherein the first flange and the second flange of the wheel hub have inner radii of at least about 0.4 m.

16. A wheel assembly as claimed in claim 9, wherein each of the plurality of rungs of the wheel hub has a length of at least about 0.4 m.

17. A wheel assembly as claimed in claim 9, wherein each of the plurality of rungs of the wheel hub has an equivalent diameter of at least about 5 cm.

18. A wheel assembly as claimed in claim 9, wherein the lubricant retention structure includes a barrel surrounding the wheel axis and connected between the first flange and the second flange.

19. A wheel assembly as claimed in claim 9, wherein the lubricant retention structure of the wheel hub includes an annular lip formed integral with an inward edge of one of the first flange or the second flange.

20. A method for making a unitary wheel hub, comprising:
pouring molten metal into a mold, the mold including
a generally annular first cavity for forming a generally annular first end of the wheel hub defining a wheel axis, the first cavity defining a mold axis,
a generally annular second cavity offset from the first cavity along the mold axis for forming a generally annular second end of the wheel hub offset from the first end along the wheel axis, and
a plurality of runners extending from the first cavity to the second cavity generally parallel to and radially displaced from the mold axis, the runners being generally evenly spaced apart around the circumferences of the first cavity and the second cavity, and each runner defining a discrete generally cylindrical volume contiguous with the first cavity and with the second cavity;
cooling the metal to form the wheel hub; and
removing the mold mould from the wheel hub.

* * * * *